No. 882,472. PATENTED MAR. 17, 1908.
W. J. LATCHFORD.
GREEN CORN HUSKING MACHINE.
APPLICATION FILED MAR. 16, 1907.
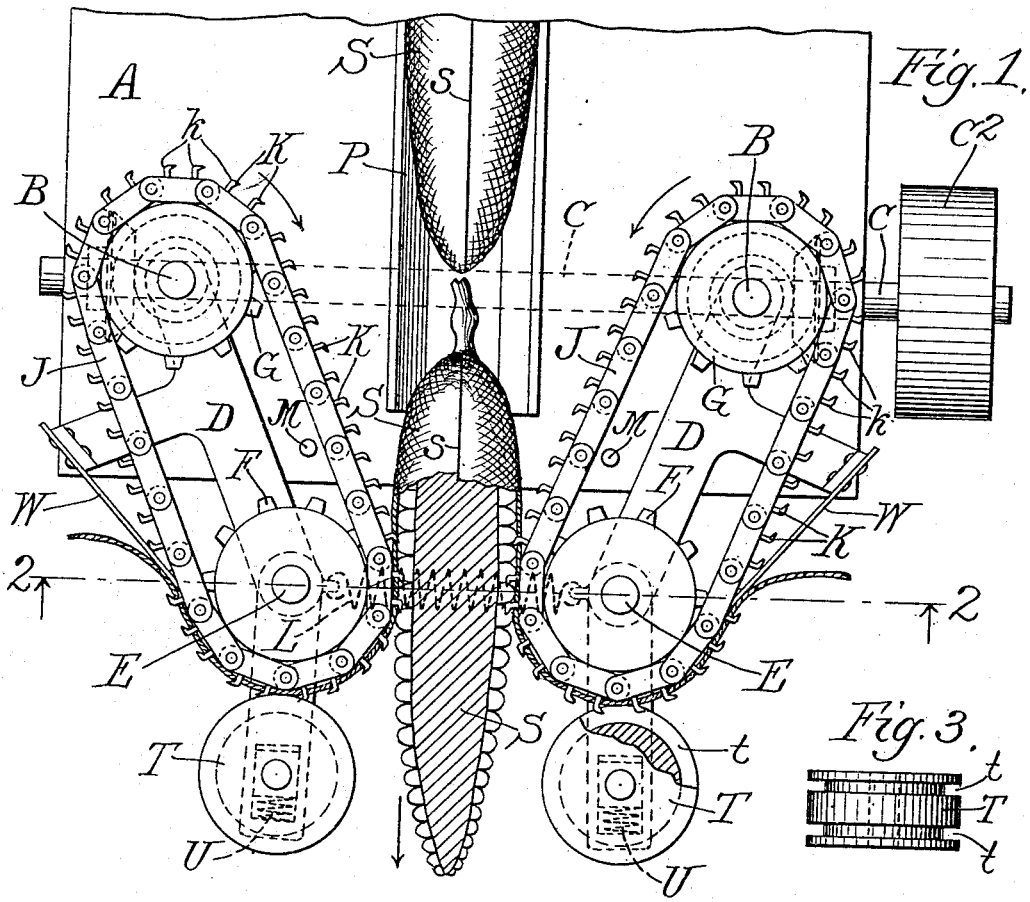
Fig. 1.
Fig. 3.
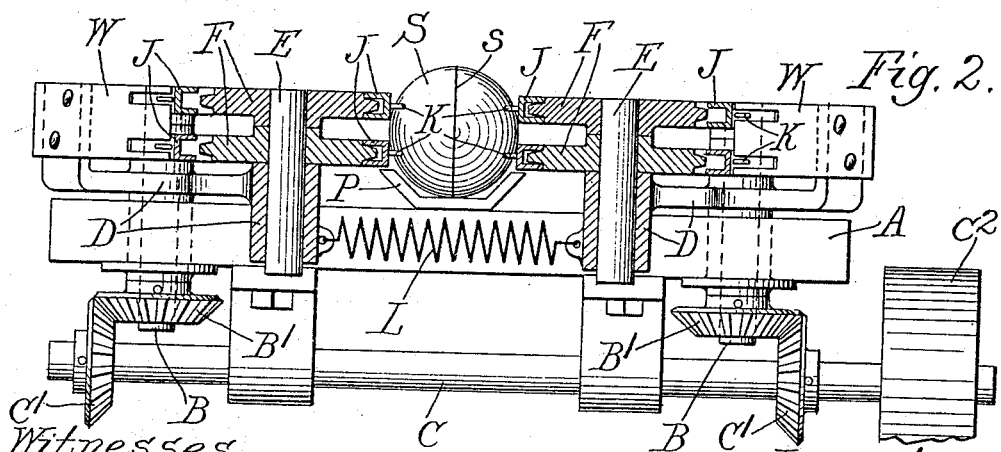
Fig. 2.
Witnesses.
Edward T. Wray.
J S Abbott
Inventor.
Wm. J. Latchford.
by Burton & Burton
his Atty's.

UNITED STATES PATENT OFFICE.

WILLIAM J. LATCHFORD, OF CHICAGO, ILLINOIS.

GREEN-CORN-HUSKING MACHINE.

No. 882,472.  Specification of Letters Patent.  Patented March 17, 1908.

Application filed March 16, 1907. Serial No. 362,605.

*To all whom it may concern:*

Be it known that I, WILLIAM J. LATCHFORD, a citizen of the United States, residing at Chicago, in the county of Cook and State of Illinois, have invented new and useful Improvements in Green-Corn-Husking Machines, of which the following is a specification, reference being had to the accompanying drawings, forming a part thereof.

The purpose of this invention is to provide an improved device for husking green corn.

It consists in the elements of construction for that purpose shown and described and indicated in the claims.

In the drawings:—Figure 1 is a plan view of a machine embodying this invention. Fig. 2 is a section at the line 2—2 on Fig. 1. Fig. 3 is an edge elevation of a husk engaging roller which assists in stripping the husk from the ear.

Upon any suitable table or support, A, there are mounted the vertical driving shafts, B, B, driven by a shaft, C, below the table said shafts being connected at their lower ends by bevel gears, $C^1$, $B^1$, on the horizontal and vertical shafts respectively, the horizontal shaft, C, having a pulley, $C^2$, by which power is communicated for operating the machine. Pivotally mounted about the vertical shafts, B, B, are horizontally-swinging frames or brackets, D, D, which extend convergingly in the same direction from their respective vertical shafts, B, above the table and project past the margin thereof. In the ends of these brackets remote from the shafts on which they are pivoted there are journaled vertical shafts, E, E, which project up from their bearings in the ends of the brackets respectively beyond the margin of the table and are provided each with two sprocket wheels, F, corresponding sprocket wheels, G, being fast on the shafts, B, above the table. Each sprocket wheel, G, is connected with the corresponding sprocket wheel, F, by a link belt or chain, J, whose links are provided with barbs, K, projecting in the plane of travel of the chains and into the space between the opposed link belts or chains on the two swinging brackets respectively. A spring, L, connects the swinging brackets operating to draw them toward each other at their ends remote from the shafts on which they are respectively pivoted, stops, M, M, being provided on the table to limit their approach. The two link belts or chains carried by each bracket are spaced from each other a distance which is designed to be substantially half the average diameter of the ears to be husked, including the husks, and the lower of the two chains has the path of travel of its barbs about half that distance above the surface of the table. The stops, M, are so located that at their point of nearest approach to each other the opposed chains are separated far enough to avoid any danger of their barbs becoming entangled, and they may be prevented from approaching nearer than about the diameter of the cob of the corn to be husked. On the table in the tapered interval between the paths of the opposed chains there is mounted a guide trough, P, for the ears of corn to be husked which extends far enough toward the point of nearest approach of the chains so that an ear lodged therein will be supported while its smaller end is advanced so that the husk will be grasped by the barbs and the ear thereby drawn onward between the opposed chains.

The form of the barbs, K, is preferably angular, as shown, with the end from angle or bend, k, projecting forward in the direction of travel so that as the chains pass around the forward sprocket wheels, F, the barbs having been sunken in the husk while moving toward the point of nearest approach of the opposed chains are turned forward in the husk and thereby engage it with a tendency to strip it from the ear as the chains travel around the outer forward ends of the sprocket wheels and thereby diverge from each other and therefore from the axis of the ear. The ear, S, is shown in the drawings having its husk split at *s* before entering between the barbed chains. Such splitting may be done in any manner and by any means not shown. Each of the two halves of the split husk will be engaged at two lines by the two barbed chains at one side, and these engagements occurring respectively above and below the horizontal plane of the axis of the ear adapt the device to fold back the husk from the plane of the split while also rolling it back commencing at the forward end.

Any means not shown may be employed to advance the ear; and this can be done by the hand of the operator using each ear to push the one ahead of it.

For insuring the retention of the husks on the barbed chains while they are traveling around the outer or forward sides of the sprocket wheels, F, to the side of said wheels opposite the ear, I provide for each pair of sprocket chains, on each side, a husk-engaging roller, T, having grooves, $t, t$, properly disposed to accommodate the barbs on the chains. These rollers are mounted on the brackets, D, preferably in boxes arranged for movement toward and from the sprocket wheels, F, springs, U, being provided to press the rollers toward the sprocket wheels and thereby against the barbed link belts for pressing the husks against the belts so as to cause them to be held and engaged strongly enough to enable the barbed belts to draw the ear of corn into the throat between the two opposed pairs of belts and strip the husks effectively, and particularly to cause the grasp of the barbed belts on the husk to be sufficient to detach the husk from the ear at the base when it has been fully stripped back to that point, and to eject the ear by the final impulse which it receives when the husk is snapped or torn free at the base. For stripping the husk from the belt on which it has been thus closely pressed by the rolls as described, I provide stripping fingers, W, W, which are supported by any convenient means, as upon the brackets, D, and forked and project astride the barbs on the belts respectively at a point in their path beyond the rolls, U.

It will be understood that the elements described as barbs, $k$, as shown are more than merely projecting teeth, since they are designed not merely to penetrate the husk but to engage with it for direct pull off from the ear; and for this reason they are described and shown in the form of hooked teeth or barbs; that is, teeth having offset projections adapted to engage behind the husk when they have penetrated it to exert a direct pull upon it laterally with respect to the ear to strip the husk away from the latter. The word "barb", as employed in the claims, is to be understood in this sense.
These teeth, however, without regard to their barbed form, merely considered as teeth projecting from the belt when associated with the roller, T, for holding the husk on to the endless belts, operate for stripping the ear by virtue of the initial disengagement which they effect off the end of the husk, which, as soon as it is engaged between the roller and the chain, is effectively held for further stripping without requiring material assistance from the barbed form of the teeth; and in combination with such roll the toothed belt may be operated as a husking device without regard to the character of the teeth as being specifically barbs.

I claim:—

1. A green corn husking machine comprising a pair of endless belts opposed to each other and provided with teeth projecting into the intervals between their proximate plies, said teeth being angularly hooked with their points extending forward in the direction of travel of the belts; means by which such belts are carried and driven, longitudinally with respect to the position of the ears to be husked, in the same direction and at substantially the same speed at their proximate plies, and means for supporting and guiding the ears into the path of the teeth as the belts travel.

2. A green corn husking machine comprising a pair of opposed endless belts provided with projecting teeth which are angularly hooked with their points extending forward in the direction of travel of the belts; means by which such belts are carried so that their proximate plies converge towards the forward end of their path; means for driving said proximate plies in the same direction and at substantially the same speed, and means for supporting and guiding the ears into the path of the teeth as the belts travel.

3. A green corn husking machine comprising a pair of endless link belts opposed to each other and having their links provided with barbs projecting into the interval between their paths; sprocket wheels by which such belts are driven and carried; yielding means connecting the bearings of the respective sprocket wheels at the forward end of the path of their proximate plies, and a support and guide for the ears of corn to be husked located between said plies back of the point of nearest approach.

4. A green corn husking machine comprising two pairs of endless link belts, the belts of each pair being parallel, the corresponding belts of the two pairs being opposed to each other; sprocket wheels by which such belts are carried, such opposed belts being mounted with their proximate plies converging toward the forward end of their path; means for driving their proximate plies in the same direction and at substantially the same speed; means yieldingly connecting their forward sprocket wheels, the belts having barbs projecting into the intervals between their proximate plies, and a support and guide for the ears of corn located in such interval.

5. A green corn husking machine comprising a table for supporting the ears of corn to be husked; two parallel vertical shafts extending through the table; means for rotating said shafts in opposite directions; horizontal brackets pivoted on said shafts respectively and extending therefrom convergingly past the margin of the table; a spring connecting their proximate ends and stops on the table limiting their approach; shafts journaled in their proximate ends parallel with the first-mentioned shafts respectively; sprocket wheels on all said shafts and endless link belts about the sprocket wheels connecting the two shafts in each bracket, the links of said belts being provided with barbs projecting into the interval between 13 their proximate plies for engaging the husks with the ears of corn which may be lodged on the table there-between.

6. In a green corn husking machine, in combination with a barbed belt for engaging and stripping the husks from the ears; a husk-retaining roller mounted for pressure toward the belt at a point beyond the engagement of the latter with the husks, the roller being grooved to accommodate the barbs, and means for stripping the husks from the belts beyond the rollers.

7. In a green corn husking machine, in combination with a pair of toothed belts for engaging the husks and means for guiding the ear to be husked between them and holding them yieldingly pressed toward each other to grasp the ear; husk-engaging rollers mounted for pressure toward the toothed belts respectively beyond the engagement of the latter with the husks, and means for stripping the husks from the belts beyond such rollers.

8. In a green corn husking machine, in combination with an endless toothed belt; an ear-feeding element opposed thereto and means for guiding the ear to be husked between said toothed belt and such opposed element; a roller mounted for pressure against the toothed belt at a point beyond the engagement of the latter with the husks to retain the husks on the belt by means of stripping the husks from the belt beyond the roller.

In testimony whereof, I have hereunto set my hand at Chicago, Illinois, this 8th day of March, A. D., 1907, in the presence of two witnesses.

WILLIAM J. LATCHFORD.

In the presence of—
M. GERTRUDE ADY,
J. S. ABBOTT.